(No Model.)
H. G. STIEBEL.
WATER SPRINKLER.
No. 422,458. Patented Mar. 4, 1890.
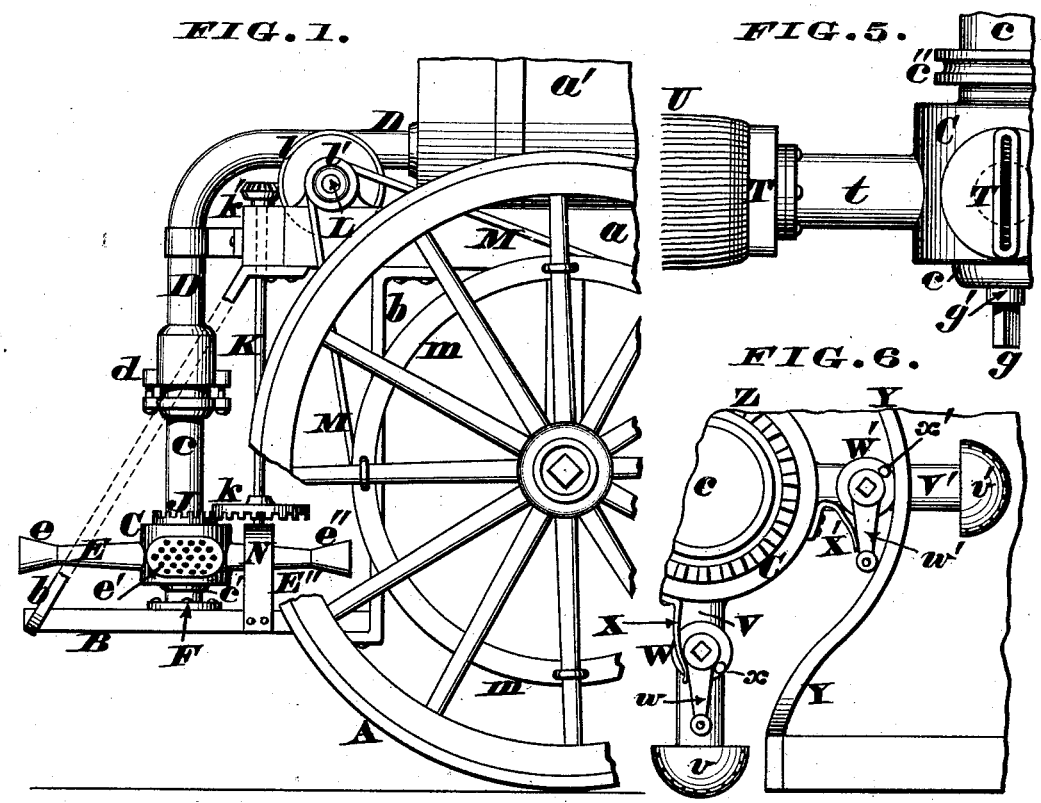
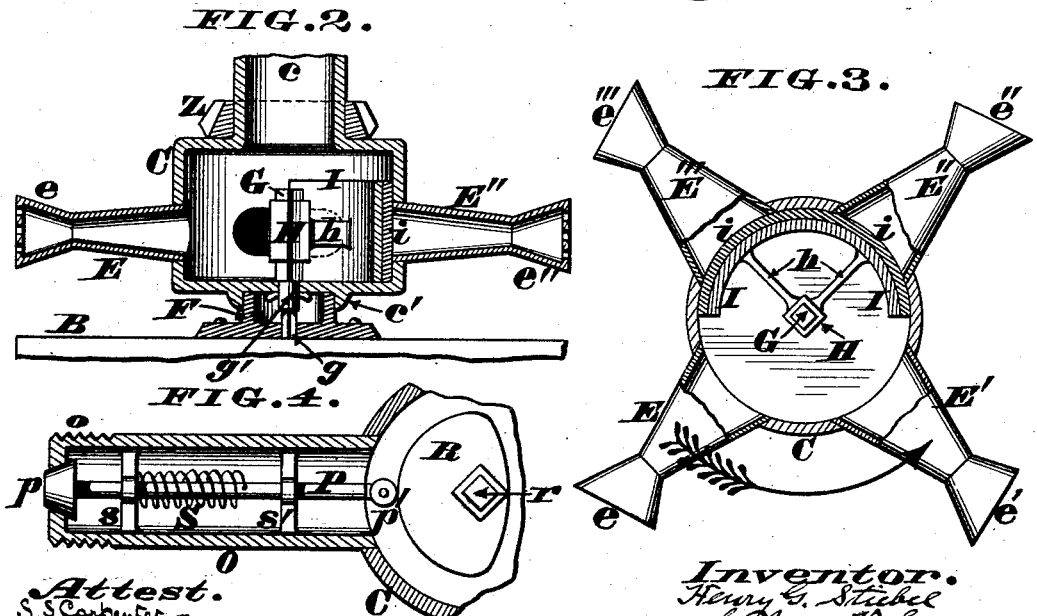
Attest.
S. S. Carpenter
Paul Carpenter
Inventor.
Henry G. Stiebel
by James N. Layman
Atty.

UNITED STATES PATENT OFFICE.

HENRY G. STIEBEL, OF CINCINNATI, OHIO.

WATER-SPRINKLER.

SPECIFICATION forming part of Letters Patent No. 422,458, dated March 4, 1890.

Application filed February 15, 1889. Serial No. 300,020. (No model.)

*To all whom it may concern:*

Be it known that I, HENRY G. STIEBEL, a citizen of the United States, residing at Cincinnati, in the county of Hamilton and State of Ohio, have invented certain new and useful Improvements in Water-Sprinklers; and I do declare the following to be a full, clear, and exact description of the invention, reference being had to the accompanying drawings, which form a part of this specification.

The object of my invention is to provide a watering cart or wagon with a sprinkling attachment that will throw the jets of water a greater distance than can be effected by the simple "head" or pressure of the fluid within the barrel or tank of such vehicles, while at the same time the front jets that would be obstructed by the wagon-wheels are automatically cut off. Said attachment consists of a hollow cylinder mounted upon a platform at the rear of the wagon and provided with a series of lateral tubes, the outer end of each tube being furnished with a rose or perforated nozzle or other device capable of dispersing the water in numerous fine jets or sprays. This cylinder is revolved positively by means of gearing or other driving connections set in motion by one of the rear wheels of the wagon, and is freely supplied with water by a conductor leading from the tank or reservoir, the device that automatically cuts off the front jets being preferably located within said cylinder. Therefore when the tank is filled with water and the wagon drawn along the streets the very high velocity imparted to the cylinder by the gearing causes the rear jets to be thrown from curb to curb, while the front jets are rendered inoperative for the time being, as hereinafter more fully described.

In the annexed drawings, Figure 1 is a side elevation of the rear portion of a watering-cart provided with the preferred construction of my sprinkler. Fig. 2 is an enlarged vertical section of the sprinkler, taken in the plane of a front and rear nozzle of the same. Fig. 3 is a horizontal section of the sprinkler, taken in the plane of its nozzles. Figs. 4, 5, and 6 show three different modifications of my invention.

Referring to Fig. 1, A represents one of the rear wheels of a watering cart or wagon. $a$ is part of the main frame of the same, and $a'$ a tank, barrel, or other reservoir mounted upon said frame. $b\ b$ are hangers depending from the rear end of this frame and supporting a platform B, upon which latter is mounted the centrifugal sprinkler, the head of which C is usually a short cylinder having at top a capacious inlet-pipe $c$, whose upper end turns freely within a stuffing-box $d$ of a delivery-pipe D, leading from the tank $a'$. Projecting laterally from this head are a number of tubes E E' E'' E''', whose outer ends have perforated nozzles, roses, or other water-dispersers $e\ e'\ e''\ e'''$, which nozzles may be soldered to said tubes, or they may be otherwise applied thereto. The lower head of cylinder C has an annular flange $c'$, surrounding the upper portion of a step or bearing F, upon which latter said cylinder revolves, the bearing having a socket to admit a square shank $g$ at the bottom of a similarly-shaped shaft G, occupying an axial position within the sprinkler. Between the shaft G and shank $g$ a journal $g'$ is situated, which journal acts as a central pivot for the cylinder C.

H is a square sleeve fitting over the shaft G and having radial arms $h$, attached to a curved plate I, which serves as a cut-off, and, if desired, the outer surface of this plate may be covered with a suitable packing $i$.

Secured either to the cylinder C or pipe $c$ is a contrate-wheel J, gearing with a similar wheel $k$ at the lower end of a shaft K, the upper end of the latter being furnished with a bevel-pinion $k'$, engaging with a bevel-wheel $l$. This bevel-wheel $l$ is keyed to the inner end of a transverse shaft L, the outer end of the latter being provided with a sprocket wheel or pulley $l'$ to receive an endless band or chain M, driven by a ring $m$, secured to the inner side of wheel A, and in some cases said shaft L may have a clutch capable of being operated by the driver, so as to throw the sprinkler either in gear or out of gear with said wheel A when occasion requires.

N is a step or bearing that supports the lower end of shaft K.

From the above description it is evident that the forward motion of the cart or wagon imparts a high velocity to the cylinder C and its lateral tubes E, and as the water flows freely into this cylinder through the inlets D and $c$ the centrifugal action of the sprinkler ejects the water at the various nozzles $e$ or other ventages. These perforated nozzles disperse the water in numerous fine jets, which are thrown from curb to curb of any ordinary street on account of the high speed of the positively-driven cylinder C, which velocity does not depend on the head of water in the tank, but it is due solely to the geared connections that operate said cylinder from the wheel A. It is evident, however, that the wheels and hangers and other attachments at the rear of the cart would interfere materially with these jets, and for this reason the front nozzles of the sprinkler are rendered inoperative for the time being, as seen in Fig. 3. Assuming, therefore, that E E' are the rear tubes and E'' E''' the front tubes of the sprinkler, it is apparent there will be a free discharge of water through said tubes E E', but none through the other tubes E'' E'''. This result is due to the fact that the cylinder C revolves around the fixed cut-off I, which latter shuts off the water from each tube while their inner ends are in contact with said plate, or, in other words, while each tube is passing from the position E'' to the position E''', the direction in which the sprinkler turns being indicated by the arrow.

In the modification of my invention seen in Fig. 4 the outer end of the lateral tube O is screw-threaded at $o$ to permit the engagement therewith of any form of detachable nozzle or sprinkler, said tube being traversed by a stem P, having at one end a plug-valve $p$ and at its opposite end a roller $p'$, adapted to come in contact with a fixed cam R, secured to a stationary shaft $r$. $s$ $s'$ are guides for said stem, and S is a spring that forces the valve $p$ away from its seat when the roller $p'$ is not in contact with the fixed cam. By this arrangement the valve is kept open at the proper time, but is automatically closed when the tube swings around to a position where it is desirable to stop the flow of water, as previously described.

In the other modification (seen in Fig. 5) the nozzle T is a flat tube bolted to the pipe $t$ in a vertical position and having a sponge, or broom, or brush U, surrounding its ventage, which broom is omitted from one of the nozzles, so as to render the vertical ventage more conspicuous. The object of this broom or equivalent dispenser is to break up the stream of water and distribute it in fine jets or spray. Furthermore, Fig. 5 shows a grooved pulley $c''$, attached to the inlet-pipe $c$, which pulley can be driven by an ordinary belt-connection, thus dispensing with the gears J $k$. (Seen in Fig. 1.)

In Fig. 6 the lateral tubes V V' are provided with cocks or valves W W', having levers $w$ $w'$, which are held in such positions as to open said cocks by means of springs X X'. $x$ $x'$ are stop-pins that limit the opening swing of said levers. Y is a curved bar, plate, or cam suitably attached to a fixed part of the wagon or platform and serving to close the cocks W W' at the proper moment by the contact of their levers $w$ $w'$ with said bar. As shown in this illustration, the cock W is open and the cock W' closed. Z is a bevel-gear secured to the cylinder, said gear being seen also in Fig. 2. Finally, Fig. 6 shows that the nozzles may take the shape of hemispherical roses $v$ $v'$.

I claim as my invention—

1. A watering cart or wagon carrying a revolving cylinder armed with lateral tubes whose outer ends are furnished with jet-dispersers, a conductor leading from said cylinder to the tank of the vehicle, mechanism for positively operating said cylinder from a driver at the rear of the wagon, and an automatic cut-off that stops the flow of water from the front tubes, but permits a free flow to the rear tubes, substantially as herein described, and for the purpose stated.

2. The combination, in a watering cart or wagon, of the cylinder C, armed with lateral tubes E E' E'' E''', having jet-dispersers at their outer ends, a conductor $c$, leading from said cylinder to the tank, mechanism for positively operating said cylinder from a driver at the rear of the vehicle, and a cut-off I, fixed within said cylinder, which cut-off automatically closes the inlets of the front tubes, but leaves the rear tubes open, substantially as herein described.

3. The combination, in a watering cart or wagon, of a cylinder armed with lateral tubes having nozzles surrounded with brushes, a conductor leading from said cylinder to the tank, mechanism for positively operating said cylinder from a driver at the rear of the vehicle, and a cut-off fixed within said cylinder, which cut-off automatically closes the inlets of the front tubes, but leaves the rear tubes open, all as herein described, and for the purpose stated.

In testimony whereof I affix my signature in presence of two witnesses.

HENRY G. STIEBEL.

Witnesses:
JAMES H. LAYMAN,
SAML. S. CARPENTER.